United States Patent
Wang et al.

(10) Patent No.: US 12,140,666 B2
(45) Date of Patent: Nov. 12, 2024

(54) GHOST OBJECT DETECTION

(71) Applicant: Aptiv Technologies AG, Schaffhausen (CH)

(72) Inventors: Yu Wang, Troy, MI (US); Zixin Liu, Auburn Hills, MI (US); Yang Wang, Novi, MI (US)

(73) Assignee: Aptiv Technologies AG, Schaffhausen (CH)

( * ) Notice: Subject to any disclaimer, the term of this patent is extended or adjusted under 35 U.S.C. 154(b) by 377 days.

(21) Appl. No.: 17/651,859

(22) Filed: Feb. 21, 2022

(65) Prior Publication Data

US 2023/0243960 A1 Aug. 3, 2023

Related U.S. Application Data

(60) Provisional application No. 63/266,937, filed on Jan. 19, 2022.

(51) Int. Cl.
| | |
|---|---|
| *G01S 13/931* | (2020.01) |
| *G01S 7/41* | (2006.01) |
| *G01S 13/06* | (2006.01) |
| *G01S 13/58* | (2006.01) |
| *G01S 13/72* | (2006.01) |

(52) U.S. Cl.
CPC .......... *G01S 13/931* (2013.01); *G01S 7/411* (2013.01); *G01S 13/06* (2013.01); *G01S 13/584* (2013.01); *G01S 13/72* (2013.01); *G01S 2013/9317* (2013.01); *G01S 2013/9325* (2013.01); *G01S 2013/9329* (2020.01)

(58) Field of Classification Search
CPC ........ G01S 13/06; G01S 13/42; G01S 13/582; G01S 13/584; G01S 13/72; G01S 13/931; G01S 17/42; G01S 17/931; G01S 2013/9317; G01S 2013/9325; G01S 2013/9329; G01S 7/292; G01S 7/354; G01S 7/411; G01S 7/4802; G01S 7/487; G01S 7/493
See application file for complete search history.

(56) References Cited

U.S. PATENT DOCUMENTS

| | | | |
|---|---|---|---|
| 9,810,782 B2 | 11/2017 | Schiffmann | |
| 2012/0056773 A1* | 3/2012 | Sato | G01S 7/354 342/109 |
| 2020/0278435 A1* | 9/2020 | Wang | G01S 13/931 |

OTHER PUBLICATIONS

"Extended European Search Report", EP Application No. 22199449.4, May 19, 2023, 11 pages.

* cited by examiner

*Primary Examiner* — Timothy A Brainard
(74) *Attorney, Agent, or Firm* — Harness, Dickey & Pierce, P.L.C.

(57) ABSTRACT

The techniques and systems herein enable ghost object detection. Specifically, a reflection line indicative of a potential reflection surface between first and second moving objects is determined. If enough stationary objects are within an area of the reflection line, it is determined whether one or more of the stationary objects within the area are within a distance of a reflection point. An expected velocity of the second object is then determined and checked against a velocity of the second object. If the expected velocity is near the velocity, it is determined that the second object is a ghost object. By doing so, the system can effectively identify ghost objects in a wide variety of environments, thereby allowing for downstream operations to function as designed.

20 Claims, 10 Drawing Sheets

GHOST OBJECT DETECTION

CROSS-REFERENCE TO RELATED APPLICATION

This application claims the benefit of U.S. Provisional Patent Application No. 63/266,937, filed Jan. 19, 2022, the disclosure of which is hereby incorporated by referenced in its entirety herein.

BACKGROUND

Advanced sensor systems are increasingly implemented in vehicles to provide situational awareness to the vehicles. Technologies such as radio detection and ranging (RADAR) and light detection and ranging (LiDAR) enable vehicles to identify and track objects proximate the vehicles. Many of such technologies, however, rely on propagation of electromagnetic waves. Because such waves can reflect off objects, many times, the waves take multiple paths to and from targets of interest. These multiple paths can lead to ghost objects, e.g., objects that appear to exist to the sensor systems but do not really exist. Accurately determining such ghosts is important in ensuring that downstream operations (e.g., advanced driver assist systems (ADAS)) function as designed. Some conventional systems attempt to identify ghost objects in specific situations (e.g., by using a guard rail tracker) or by using multiple sensors. Such conventional systems, however, are often unable to identify ghosts in broader environments and/or without a priori information about the environments.

SUMMARY

This document is directed to systems, apparatuses, techniques, and methods for enabling ghost object detection. The systems and apparatuses may include components or means (e.g., processing systems) for performing the techniques and methods described herein.

Some aspects described below include a system including at least one processor configured to receive information about a plurality of objects proximate a host vehicle. The objects may include two or more moving objects and one or more stationary objects. The processor is also configured to determine one or more moving object pairs of the moving objects. The processor is also configured to, for each of the moving object pairs, determine a reflection line that is perpendicular to a connection line connecting a first object and a second object of the respective moving object pair and between the first object and the second object. The processor is also configured to determine whether one or more of the stationary objects are within an area of an intersection of the connection line and the reflection line. The processor is also configured to, based on a determination that one or more of the stationary objects are within the area, determine whether one or more of the one or more of the stationary objects are within a distance of a reflection point that is at an intersection of a signal line between the second object and the host vehicle and the reflection line. The processor is also configured to, based on a determination that one or more of the one or more stationary objects are within the distance, determine, based on the first object and the reflection line, an expected velocity of the second object and determine whether a velocity of the second object is within a differential speed of the expected velocity. The processor is also configured to, based on the velocity of the second object being within the differential speed of the expected velocity, determine that the second object is a ghost object and output an indication that the second object is a ghost object.

The techniques and methods may be performed by the above system, another system or component, or a combination thereof. Some aspects described below include a method that includes receiving information about a plurality of objects proximate a host vehicle. The objects may include two or more moving objects and one or more stationary objects. The method also includes determining one or more moving object pairs of the moving objects. The method also includes, for each of the moving object pairs, determining a reflection line that is perpendicular to a connection line connecting a first object and a second object of the respective moving object pair and between the first object and the second object. The method also includes determining whether one or more of the stationary objects are within an area of an intersection of the connection line and the reflection line. The method also includes, based on a determination that one or more of the stationary objects are within the area, determining whether one or more of the one or more of the stationary objects are within a distance of a reflection point that is at an intersection of a signal line between the second object and the host vehicle and the reflection line. The method also includes, based on a determination that one or more of the one or more stationary objects are within the distance, determining, based on the first object and the reflection line, an expected velocity of the second object and determining whether a velocity of the second object is within a differential speed of the expected velocity. The method also includes, based on the velocity of the second object being within the differential speed of the expected velocity, determining that the second object is a ghost object and outputting an indication that the second object is a ghost object.

The components may include computer-readable media (e.g., non-transitory storage media) including instructions that, when executed by the above system, another system or component, or a combination thereof, implement the method above and other methods. Some aspects described below include computer-readable storage media including instructions that, when executed, cause at least one processor to receive information about a plurality of objects proximate a host vehicle. The objects may include two or more moving objects and one or more stationary objects. The instructions also cause the processor to determine one or more moving object pairs of the moving objects. The instructions also cause the processor to, for each of the moving object pairs, determine a reflection line that is perpendicular to a connection line connecting a first object and a second object of the respective moving object pair and between the first object and the second object. The instructions also cause the processor to determine whether one or more of the stationary objects are within an area of an intersection of the connection line and the reflection line. The instructions also cause the processor to, based on a determination that one or more of the stationary objects are within the area, determine whether one or more of the one or more of the stationary objects are within a distance of a reflection point that is at an intersection of a signal line between the second object and the host vehicle and the reflection line. The instructions also cause the processor to, based on a determination that one or more of the one or more stationary objects are within the distance, determine, based on the first object and the reflection line, an expected velocity of the second object and determine whether a velocity of the second object is within a differential speed of the expected velocity. The instructions also cause the processor to, based on the velocity of the second object being within the differential speed of the expected velocity, determine that the second object is a ghost object and output an indication that the second object is a ghost object.

This Summary introduces simplified concepts for enabling ghost object detection that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling ghost object detection are described with reference to the following drawings that use some of the same numbers throughout to reference like or examples of like features and components.

DETAILED DESCRIPTION

Overview

Environment detection systems (e.g., RADAR and LiDAR) often struggle to differentiate ghost objects from actual objects. For example, when a vehicle is parked near a wall, an approaching vehicle may be detected along with a ghost of the approaching vehicle (due to multipath reflections off the wall). Many conventional techniques rely on complicated systems (e.g., multiple sensors or fusion), specific algorithms (e.g., guard rail detection), or physically changing the environment (e.g., maneuvering the host vehicle) to determine ghost objects. Doing so decreases functionality while increasing cost.

The techniques and systems herein enable ghost object detection. Specifically, a reflection line indicative of a potential reflection surface between first and second moving objects is determined. If enough stationary objects are within an area of the reflection line, it is determined whether one or more of the stationary objects within the area are within a distance of a reflection point. An expected velocity of the second object is then determined and checked against a velocity of the second object. If the expected velocity is near the velocity, it is determined that the second object is likely a ghost object. By doing so, the system is able to effectively identify ghost objects in a wide variety of environments, thereby allowing for downstream operations to function as designed.

Example Environments

Figure 1A:
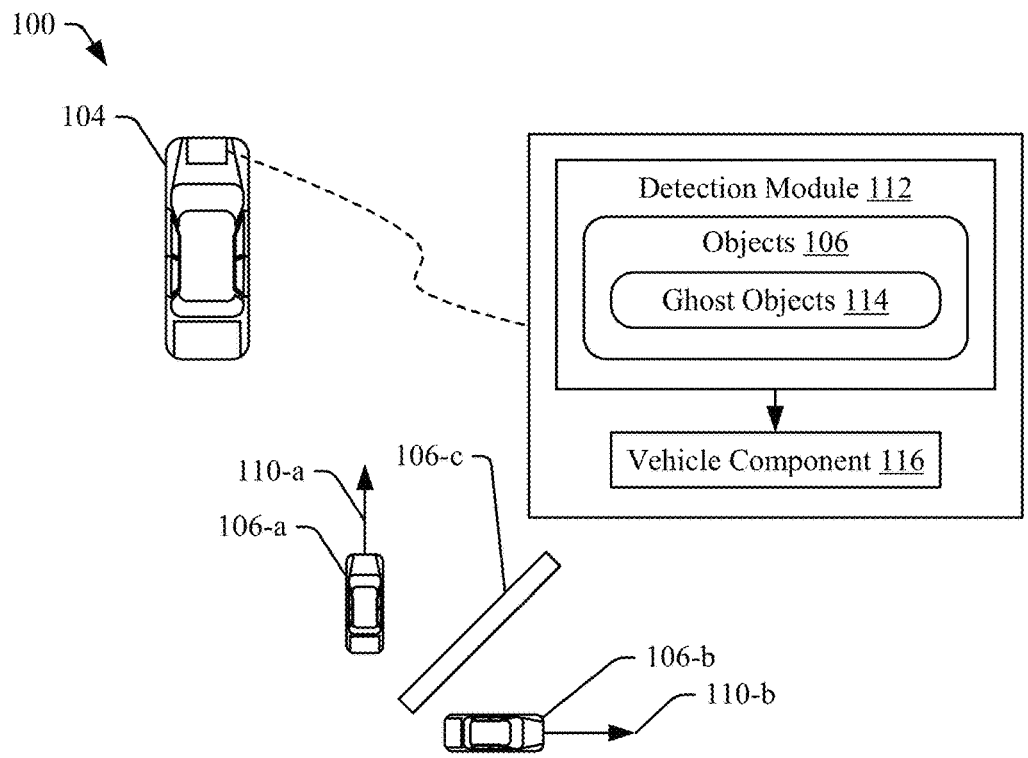
FIGS. 1A and 1B illustrate, in accordance with techniques of this disclosure, example environments where ghost object detection may be used.
Figure 1B:
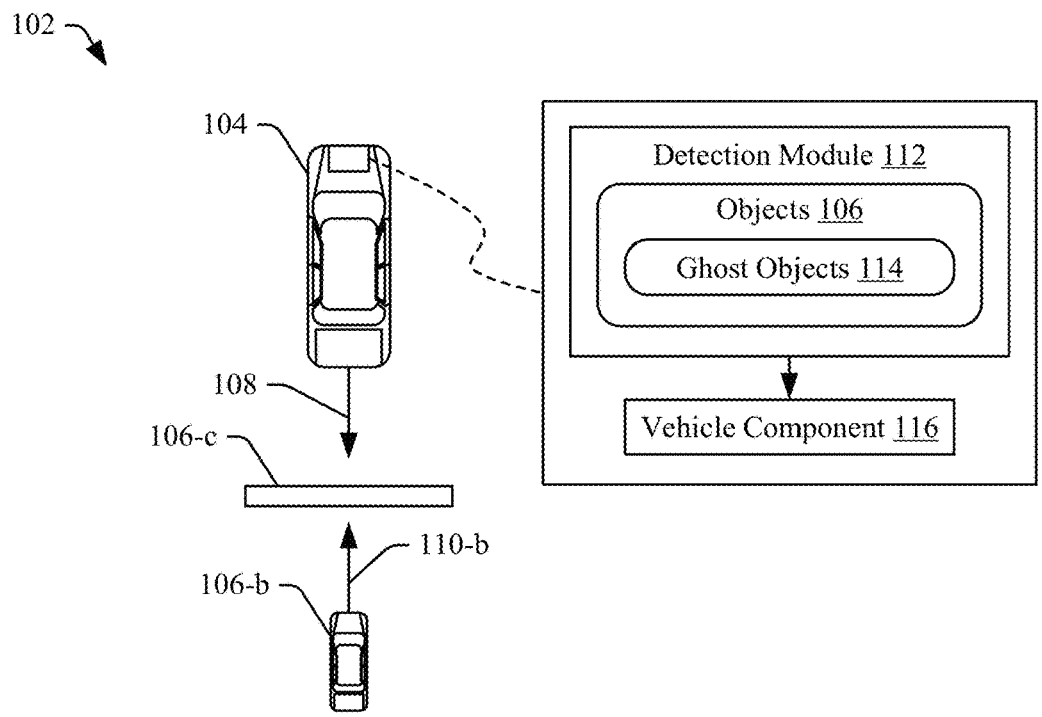

FIGS. 1A and 1B illustrate example environments 100, 102 where ghost object detection may be used. FIG. 1A illustrates example environment 100, while FIG. 1B illustrates example environment 102. The example environments 100, 102 contain a host vehicle 104 and objects 106 that are detected by the host vehicle 104. The host vehicle 104 may be any type of system (automobile, car, truck, motorcycle, e-bike, boat, air vehicle, and so on). The objects 106 may be any type of moving or stationary objects (automobile, car, truck, motorcycle, e-bike, boat, pedestrian, cyclist, boulder, sign, wall, and so on). The objects 106 are classified as moving or stationary objects. For example, objects 106-$a$, 106-$b$ are moving objects (e.g., vehicles) while object 106-$c$ is a stationary object (e.g., a wall).

In the example environment 100, the host vehicle 104 is stationary (e.g., parked). In the example environment 102, the host vehicle 104 is reversing with a host velocity 108. The present disclosure is not limited to reversing, however, and the techniques described herein may be applicable to the host vehicle 104 moving in any direction. The objects 106 have object velocities 110. It may be assumed that the stationary objects (e.g., object 106-$c$) have an object velocity of zero.

To determine ghost objects, the host vehicle 104 contains a detection module 112 that is configured to identify which of the objects 106 that are moving are ghost objects 114 (e.g., not real objects). In the example environment 100, object 106-$b$ is a ghost of object 106-$a$ created by reflections off object 106-$c$. In the example environment 102, object 106-$b$ is a ghost of the host vehicle 104 created by reflections off object 106-$c$. Thus, in both example environments 100, 102, object 106-$b$ is a ghost object 114.

The objects 106, with or without the ghost objects 114, may be sent to, or otherwise received by a vehicle component 118. The vehicle component 118 may be any downstream operation, function, or system that uses information about the objects 106 to perform a function. Depending on implementation, the detection module 112 may output indications of the ghost objects 114, remove the ghost objects 114 from the objects 106, output indications of real objects of the objects 106, or some combination thereof.

Accordingly, the detection module 112 is able to identify ghost objects 114 when the host vehicle 104 is stationary and when it is moving without any a priori information about the environment and without sensor fusion or complicated object trackers. In doing so, the detection module 112 may be able to efficiently identify the ghost objects 114 (and possibly filter them out) in a wide variety of environments such that downstream operations can function as designed.

Example System

Figure 2:
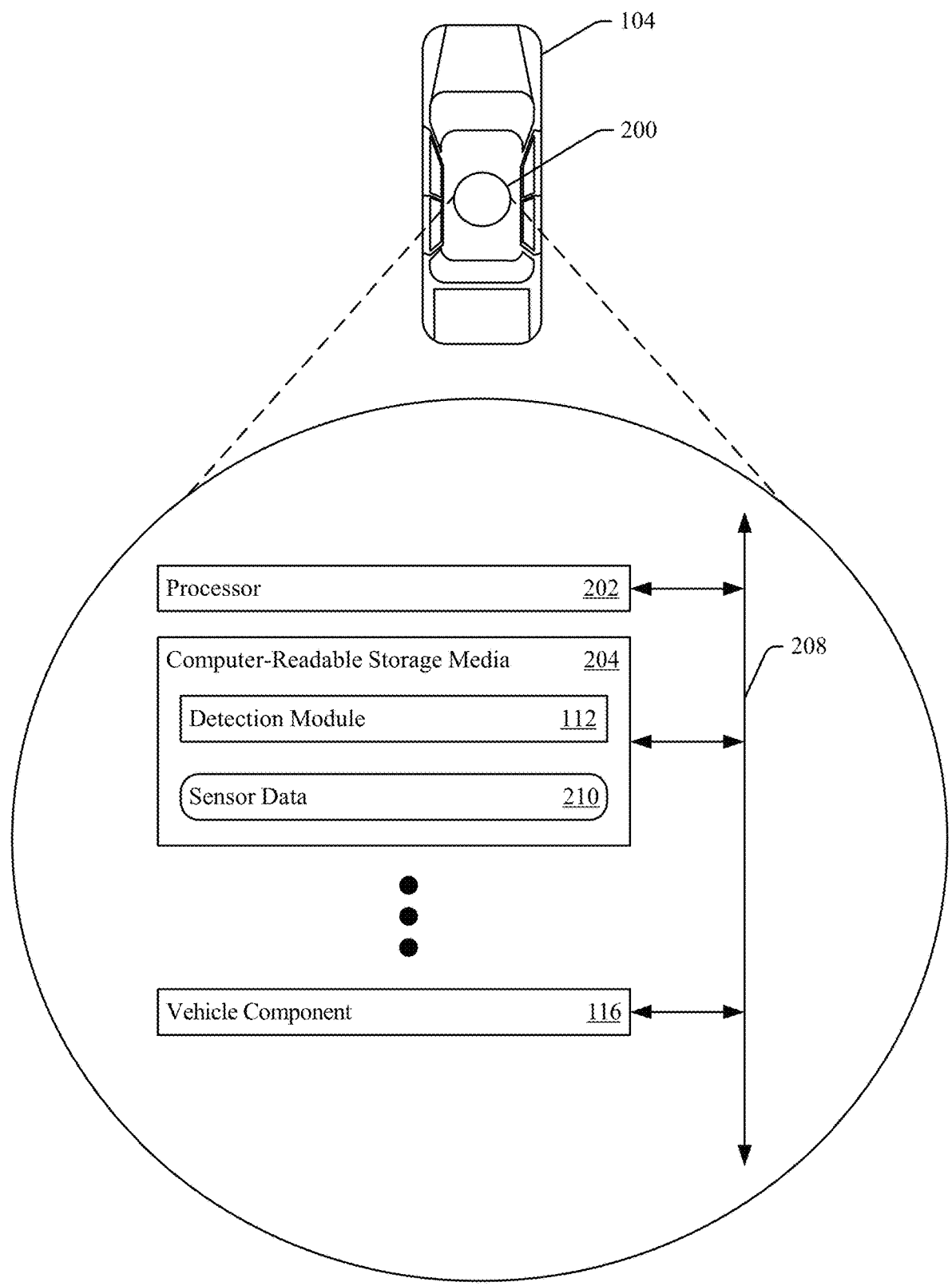
FIG. 2 illustrates, in accordance with techniques of this disclosure, an example system of a host vehicle configured to implement ghost object detection.

FIG. 2 illustrates an example system 200 configured to be disposed in the host vehicle 104 and configured to implement ghost object detection. Components of the example system 200 may be arranged anywhere within or on the host vehicle 104. The example system 200 may include at least one processor 202, computer-readable storage media 204 (e.g., media, medium, mediums), and the vehicle component 116. The components are operatively and/or communicatively coupled via a link 208.

The processor 202 (e.g., application processor, microprocessor, digital-signal processor (DSP), controller) is coupled to the computer-readable storage media 204 via the link 208 and executes instructions (e.g., code) stored within the computer-readable storage media 204 (e.g., non-transitory storage device such as a hard drive, solid-state drive (SSD), flash memory, read-only memory (ROM)) to implement or otherwise cause the detection module 112 (or a portion thereof) to perform the techniques described herein. Although shown as being within the computer-readable storage media 204, the detection module 112 may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 202 and the computer-readable storage media 204 may be any number of components, comprise multiple components distributed throughout the host vehicle 104, located remote to the host vehicle 104, dedicated or shared with other components, modules, or systems of the host vehicle 104, and/or configured differently than illustrated without departing from the scope of this disclosure.

The computer-readable storage media 204 also contains sensor data 210 generated by one or more sensors or types of sensors (not shown) that may be local or remote to the example system 200. The sensor data 210 indicates or otherwise enables the determination of information usable to perform the techniques described herein. For example, one or more of the sensors (e.g., RADAR, LiDAR) may generate sensor data 210 indicative of information about the objects 106. The sensor data 210 may be used to determine other attributes, as discussed below.

In some implementations, the sensor data 210 may come from a remote source (e.g., via link 208). The example system 200 may contain a communication system (not shown) that receives sensor data 210 from the remote source.

The vehicle component 116 contains one or more systems or components that are communicatively coupled to the detection module 112 and configured to use information about the objects 106 (e.g., about the real objects, the ghost objects 114, or some combination thereof) to perform a vehicle function. For example, the vehicle component 116 may comprise an ADAS with means for accelerating, steering, or braking the host vehicle 104. The vehicle component 116 is communicatively coupled to the detection module 112 via the link 208. Although shown as separate components, the detection module 112 may be part of the vehicle component 116 and visa-versa.

Example Data Flow

Figure 3:
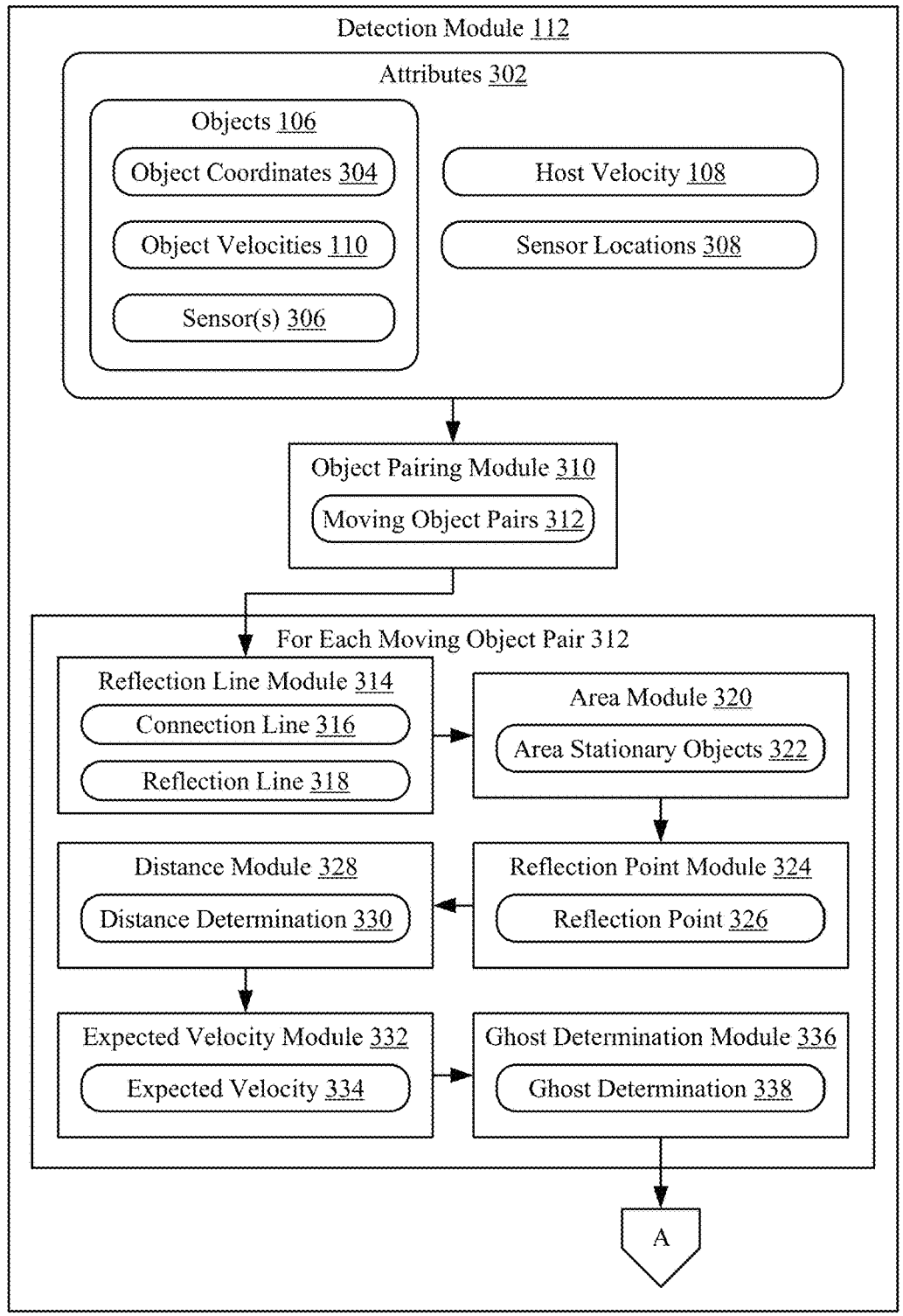
FIG. 3 illustrates, in accordance with techniques of this disclosure, an example data flow for ghost object detection.
Figure 4:
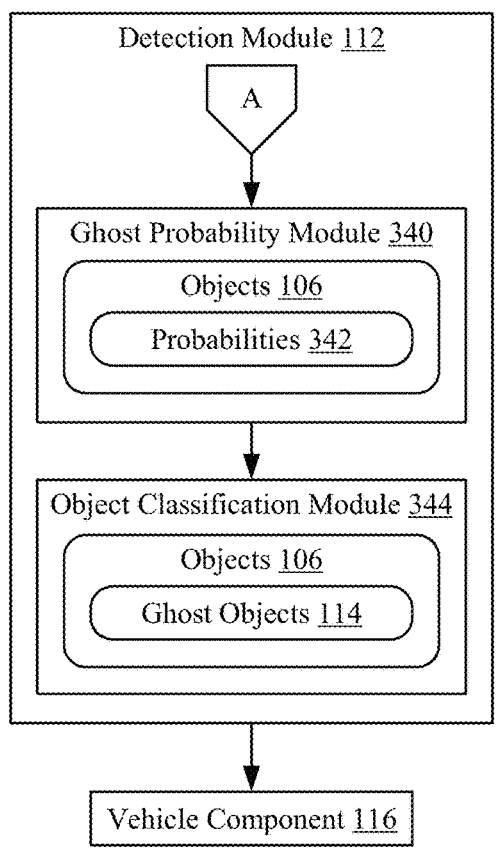
FIG. 4 illustrates, in accordance with techniques of this disclosure, further aspects of the data flow of FIG. 3.

FIGS. 3 and 4 are an example data flow 300 of ghost object detection. The example data flow 300 may be implemented in any of the previously described environments and by any of the previously described systems or components. For example, the example data flow 300 can be implemented in the example environments 100, 102 and/or by the example system 200. The example data flow 300 may also be implemented in other environments, by other systems or components, and utilizing other data flows or techniques. Example data flow 300 may be implemented by one or more entities (e.g., the detection module 112). The order in which the operations are shown and/or described is not intended to be construed as a limitation, and the order may be rearranged without departing from the scope of this disclosure. Furthermore, any number of the operations can be combined with any other number of the operations to implement the example data flow or an alternate data flow.

The example data flow 300 starts with attributes 302 of an environment (e.g., example environments 100, 102) being obtained by the detection module 112. As shown, the attributes 302 include the objects 106 including their respective object coordinates 304, object velocities 110, and sensor(s) 306. The sensors 306 are indications of which of the vehicle sensors detected the respective objects. For example, many times, an object 106 may be detected by multiple sensors in respective locations relative to the host vehicle 104. The object coordinates 304 may be absolute coordinates (e.g., relative to the Earth) or relative to the host vehicle 104. For example, the object coordinates 304 may be latitude and longitude coordinates, range and azimuth coordinates, lateral and longitudinal coordinates, or any other information that enables the host vehicle 104 to determine at least two-dimensional locations of the objects 106 relative to the host vehicle 104 (e.g., locations in or relative to a vehicle coordinate system (VCS)). The object velocities 110 may have respective speeds and directions, or speed vector components (e.g., lateral and longitudinal speeds). The attributes 302 also include the host velocity 108 and sensor locations 308 that are indicative of physical locations of the respective sensors 306.

The attributes 302 may be acquired, received, or determined by the detection module 112. For example, the detection module 112 may determine the attributes 302 directly from the sensor data 210, from a bus or interface connected to sensors that interface with the example system 200 (e.g., sensors 306), or from another module or system of the example system 200. Regardless of how or where the attributes 302 are gathered, received, derived, or calculated, the detection module 112 is configured to use the attributes 302 to determine which of the objects 106, if any, are ghost objects 114.

To do so, the attributes 302 are input into an object pairing module 310. The object pairing module 310 is configured to generate moving object pairs 312 of the objects 106. The object pairing module 310 may first determine which of the objects 106 are moving objects and which of the objects 106 are stationary objects. Then, the object pairing module 310 may generate the moving object pairs 312 from each combination of two of the moving objects responsive to determining that the host vehicle 104 is stationary. The object pairing module 310 may generate the moving object pairs 312 from each combination of the host vehicle 104 and the moving objects responsive to determining that the host vehicle 104 is reversing. The moving object pairs 312 contain respective first and second objects, the second object being at a further distance from the host vehicle 104. In the case of the host vehicle 104 reversing, the first object is the host vehicle 104. The second objects are potential ghost objects.

As part of generating the moving object pairs 312, the object pairing module 310 may look for moving objects that share the same sensors 306 (e.g., they are in a same field of view of one or more of the sensors 306). If the host vehicle 104 is reversing, such a determination may not be made (e.g., all of the moving objects in this scenario may satisfy the constraint). The object pairing module 310 may also look for range differences that are between certain values, e.g., ranges to second objects minus ranges to first objects that are between 0.5 to 20 meters. In some implementations, the range differences may be distances between the respective objects (instead of or in combination with differences in ranges to the host vehicle 104). If the host vehicle 104 is reversing, the range differences may be the moving objects' respective ranges (e.g., because the host vehicle 104 has a location at the origin). The object pairing module 310 may also look for moving objects with object velocities 110 that are greater than a moving speed threshold, e.g., object velocities 110 are greater than 0.4 meters per second. If one or more of these criteria are not met for a pair of objects (e.g., two of the objects 106 if the host vehicle 104 is stationary or the host vehicle 104 and one of the objects 106 if the host vehicle 104 is reversing), the object pairing module 310 may not consider the pair of objects to be a moving object pair 312. Furthermore, if no suitable pairs of objects can be found (e.g., based on one or more of the criteria), the process may wait until a next cycle (e.g., none of the objects 106 in the current cycle may be determined to be ghost objects 114).

Then, for each moving object pair 312, a reflection line module 314 generates a connection line 316 and a reflection line 318. The connection line 316 is a line that runs through centroids of the first and second objects of the respective moving object pair 312. If the host vehicle 104 is reversing, the connection line 316 may run through an origin of the VCS to the centroid of the second object of the moving object pair 312. The reflection line 318 is a line that runs through a midpoint of a segment of the connection line 316 between the first and second points and is perpendicular to the connection line 316. In general, the reflection line 318 represents a potential reflection surface if the second object of the moving object pair 312 is a ghost object 114. Details of the connection line 316 and the reflection line 318 are shown in FIG. 5.

Next, for the moving object pair 312, an area module 320 determines whether any of the stationary objects are within an area of the connection line 316 and the reflection line 318. The area may be rectangular and aligned with the connection line 316 and the reflection line 318. The stationary objects that are within the area become area stationary objects 322. In some implementations, the area module 320 may only indicate stationary objects within the area as being area stationary objects 322 responsive to determining that a plurality of the stationary objects are within the area (e.g., five). If one or a plurality of the stationary objects (depending upon implementation) are not within the area, no area stationary objects 322 are indicated, and the process may move to the next moving object pair 312 (e.g., the second object is not considered to be a ghost object 114). Details of the area are shown in FIG. 6.

Then, a reflection point module 324 determines a reflection point 326 indicative of a potential reflection point for a ghost detection of the second object. The reflection point 326 may be at an intersection of a signal line that runs through the centroid of the second object and a location of the host vehicle 104 and the reflection line 318. The location on the host vehicle 104 may be a virtual sensor location that is at an average location between the sensors 306 of the first and second objects (relative to a VCS). If only one sensor detects the first and second objects (or the second object if the host vehicle 104 is reversing), then the virtual sensor location may be the sensor location. If the reflection point 326 cannot be determined (e.g., the signal line and the reflection line 318 are parallel), the process may move to the next moving object pair 312 (e.g., the second object is not considered to be a ghost object 114). Details of the reflection point 326 are shown in FIG. 7.

Next, a distance module 328 generates a distance determination 330 (yes/no) based on whether any of the area stationary objects 322 are within a distance of the reflection point 326 (e.g., within 3 meters of the reflection point 326). If any of the area stationary objects 322 are within the distance of the reflection point 326, then the distance determination 330 is yes. If none of the area stationary objects 322 are within the distance of the reflection point 326, then the distance determination 330 is no. If the distance determination 330 is no, the process may move to the next moving object pair 312 (e.g., the second object is not considered to be a ghost object 114). Details of the distance are shown in FIG. 8.

Then, an expected velocity module 332 generates an expected velocity 334 for the second object. The expected velocity 334 is indicative of an expected velocity of the second object if the second object is a ghost of the first object or the host vehicle 104). Details of the expected velocity 334 are shown in FIG. 9

Next, a ghost determination module 336 generates a ghost determination 338 (yes/no) based on the object velocity 110 of the second object and the expected velocity 334. The ghost determination module 336 may determine whether a speed and/or two vector speeds of the object velocity 110 of the second object are within a differential speed of a speed and/or two vector speeds of the expected velocity 334. Equations 1 show two example conditions indicative of the comparison, one or both of which may be used to generate the ghost determination 338.

$$\text{Abs}(\text{Speed}_{egv} - \text{Speed}_{ov}) \leq ds \quad \text{Condition 1:}$$

$$\text{Abs}(\text{LongSpeed}_{egv} - \text{LongSpeed}_{ov}) \leq ds \quad \begin{array}{c} \text{and} \\ \hline \text{or} \end{array} \quad \text{Condition 2}$$

$$\text{Abs}(\text{LatSpeed}_{egv} - \text{LatSpeed}_{ov}) \leq ds \quad (1)$$

where $\text{Speed}_{egv}$ is the speed of the expected velocity 334, $\text{Speed}_{ov}$ is the speed of the object velocity 110 of the second object, ds is the differential speed and may be based on a distance between the first and second objects (e.g., 0.04*distance), $\text{LongSpeed}_{egv}$ is the longitudinal speed of the expected velocity 334, $\text{LongSpeed}_{ov}$ is the longitudinal speed of the object velocity 110 of the second object, $\text{LatSpeed}_{egv}$ is the lateral speed of the expected velocity 334, and $\text{LatSpeed}_{ov}$ is the lateral speed of the object velocity 110 of the second object. Longitudinal and lateral speeds are an example of two vector speeds. Other vector components of the velocities may be used departing from the scope of this disclosure.

If the ghost determination 338 is no (e.g., one or both of the conditions are not met), the process may move to the next moving object pair 312 (e.g., the second object is not considered to be a ghost object 114). If the ghost determination 338 is yes, the second object of the respective moving object pair 312 is likely a ghost object 114. The process above may be repeated for other moving object pairs 312 to generate indications of likely ghost objects for the current frame. It should be noted that the first object of one moving object pair 312 may be the second object of another moving object pair 312.

Then, a ghost probability module 340 may track probabilities 342 of the objects 106. The probabilities 342 are indicative of probabilities that the objects 106 are ghost objects 114. In some implementations, only the moving objects may have probabilities 342. In order to calculate the probabilities 342, the indications of likely ghost objects for the current frame (e.g., all second objects that had a ghost determination 338 of yes for the current frame) are used to update current probabilities 342 for the respective objects. The objects 106 or the moving objects may start (e.g., in the first detected frame) with probabilities of 0.5. The probabilities 342 may be updated according to Equations 2.

$$p_{new} = (1 - lpf_\alpha) * p_{current} + lpf_\alpha, \text{ if ghost determination 338 is yes, otherwise}$$

$$p_{new} = 0.996 * p_{current} \quad (2)$$

where $p_{new}$ is a new probability 342 for the respective object 106, $p_{current}$ is a current probability 342 for the respective object 106, and $lpf_\alpha$ is a constant (e.g., 0.3).

Next an object classification module 344 may generate indications of which of the objects 106 are ghost objects 114. The object classification module 344 may generate the indications when the probabilities 342 reach a probability threshold (e.g., 0.8). By using probabilities and tracking the ghost determinations 338 over time, the object classification module 344 can more reliably determine the ghost objects 114. As discussed above, indications of the objects 106 (e.g., real objects, ghost objects 114, or some combination thereof) are sent to or received by the vehicle component 116 for use in downstream operations.

By using the above techniques, the detection module 112 is able to identify ghost objects 114 when the host vehicle 104 is stationary and when it is moving without any a priori information about the environment and without sensor fusion or complicated object trackers. In doing so, the detection module 112 may be able to efficiently identify the ghost objects 114 (and possibly filter them out) in a wide variety of environments such that downstream operations can function as designed.

Example Calculations

FIGS. 5A-9 illustrate example aspects of the process discussed above. The example illustrations correspond to the example environments of FIG. 1. For example, example illustrations 500, 502 correspond to example environments 100, 102, respectively, example illustrations 600, 602 correspond to example environments 100, 102, respectively, and so on. The following is not limited to those two environments, however. The objects 106 may be in any orientation relative to the host vehicle 104 and have any object velocities 110 without departing from the scope of this disclosure.

Figure 5A:
FIGS. 5A and 5B illustrate, in accordance with techniques of this disclosure, example connection lines and reflection lines.
Figure 5A:
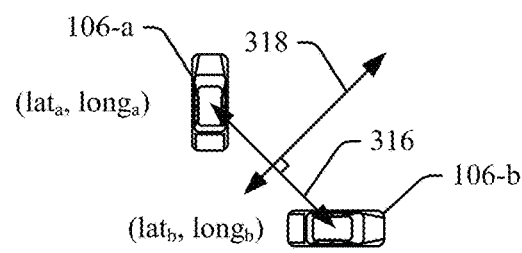
Figure 5B:
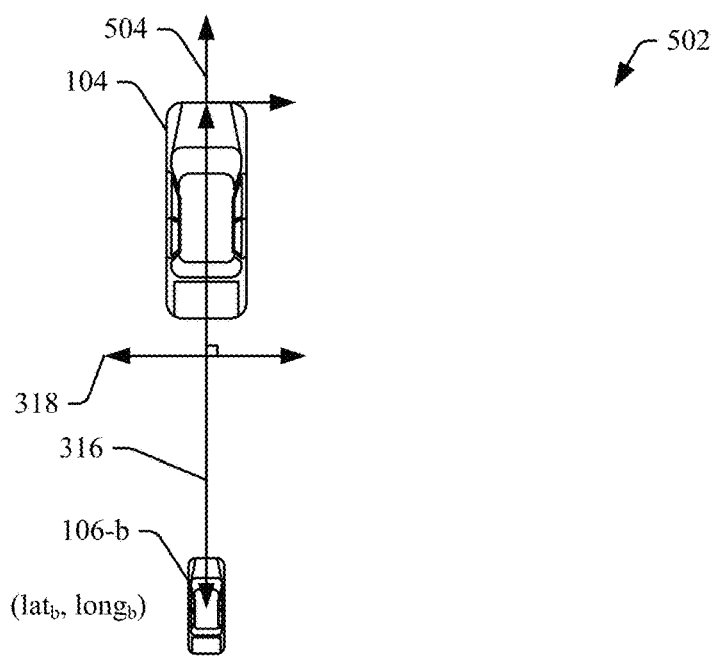

FIGS. 5A and 5B illustrate, at example illustrations 500 and 502, respectively, example connection lines 316 and reflection lines 318. The host vehicle 104 has a VCS 504. The VCS may have longitudinal and lateral axes and an origin at a center of a front bumper of the host vehicle 104. Different axes and/or origins may be used without departing from the scope of this disclosure. The connection line 316 is illustrated as going through the centroids of the first and second objects of illustration 500 (e.g., objects 106-a and 106-b). The connection line 316 is illustrated as going through the origin of the VCS 504 and the centroid of the second object of illustration 502 (e.g., object 106-b). Objects 106-a and 106-b have object coordinates 304 relative to the VCS 504 (e.g., lateral/longitudinal). The object coordinates 304 are used to determine the connection line 316. The reflection line 318 is at a midpoint of a segment of the connection line 316 between the two objects (e.g., centroids of objects 106-a and 106-b or origin of VCS 504 and centroid of 106-b) and at a right angle to the connection line. The reflection line 318 may be given by Equation 3.

$$a1 * \text{long} + b1 * \text{lat} + c1 = 0 \quad (3)$$

where $a1 = {}^2(\text{long}_b - \text{long}_a)$, $b1 = {}^2(\text{lat}_b - \text{lat}_a)$, $c1 = (\text{long}_a^2 + \text{lat}_a^2) - (\text{long}_b^2 + \text{lat}_b^2)$.

Figure 6A:
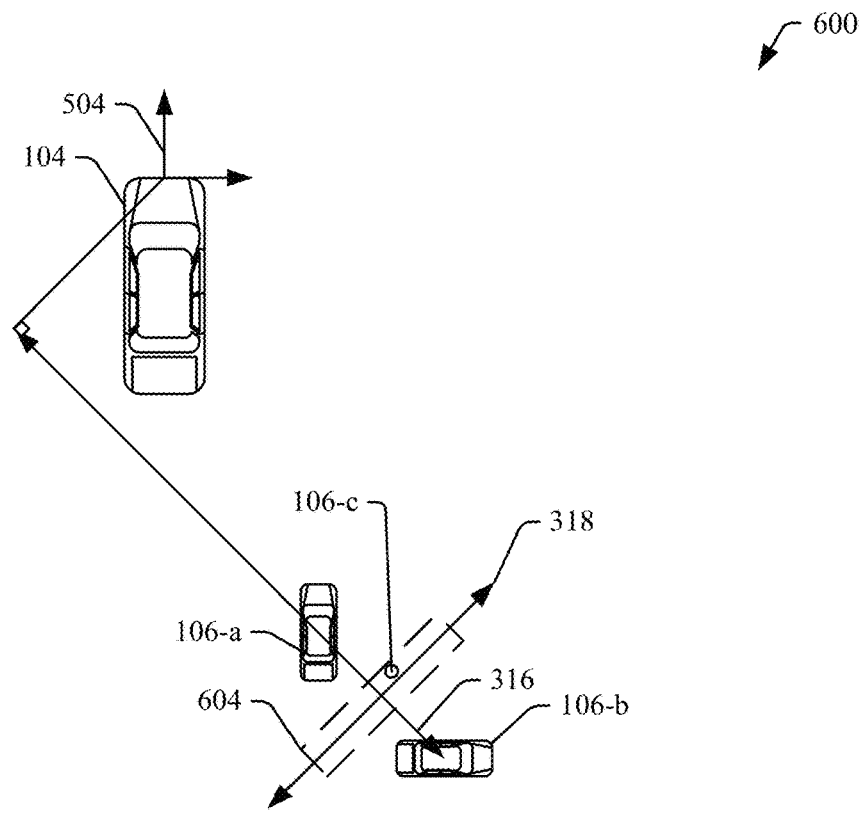
FIGS. 6A and 6B illustrate, in accordance with techniques of this disclosure, example area stationary objects.
Figure 6B:
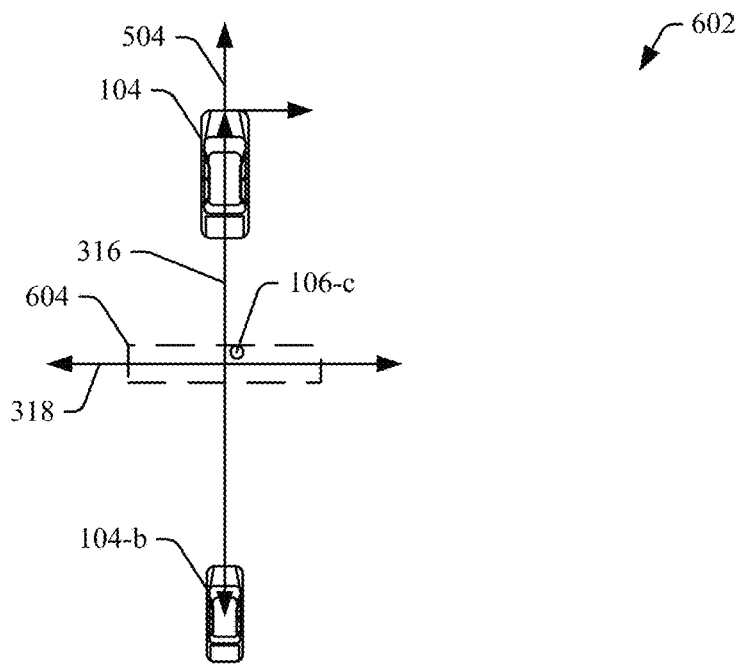

FIGS. 6A and 6B illustrate, at example illustrations 600 and 602, respectively, example area stationary objects 322. The area 604 (for determining the area stationary objects 322) may be centered on the intersection of the connection line 316 and reflection line 318. The area 604 may also be rectangular and oriented such that a length is parallel to the reflection line 318 and a width is parallel to the connection line 316. The length may be on the order of five times the width. For example, the length may be 20 meters and the width may be 4 meters.

To determine whether the stationary objects are within the area 604, each of the stationary objects may be projected onto the connection line 316 along with the first and second objects. The projected stationary objects should be within half the width of the area 604 of the middle point between the projected first and second objects. Each of the stationary objects may also be projected onto the reflection line 318 along with the first and second objects (will be a single point because the connection line 316 and reflection line 318 are perpendicular). The projected stationary objects should be within half the length of the area 604 of the projected first and second objects. Projecting the objects 106 onto the connection line 316 and the reflection line 318 is just one technique of determining whether the stationary objects are within the area 604. Other techniques may be used (e.g., coordinate conversion, axes rotation, graphical analysis) without departing from the scope of this disclosure.

In the example illustrations 600, 602, object 106-c is within the area 604, as object 106-c is a reflecting object (as stated in FIG. 1A or 1). Although a single point is shown, object 106-c may provide multiple points with any number of them being within the area 604. For example, the object 106-c may comprise ten objects 106, where five of them are within the area 604. Again, any of the stationary objects that are within the area 604 become the area stationary objects 322 (e.g., object 106-c).

Figure 7A:
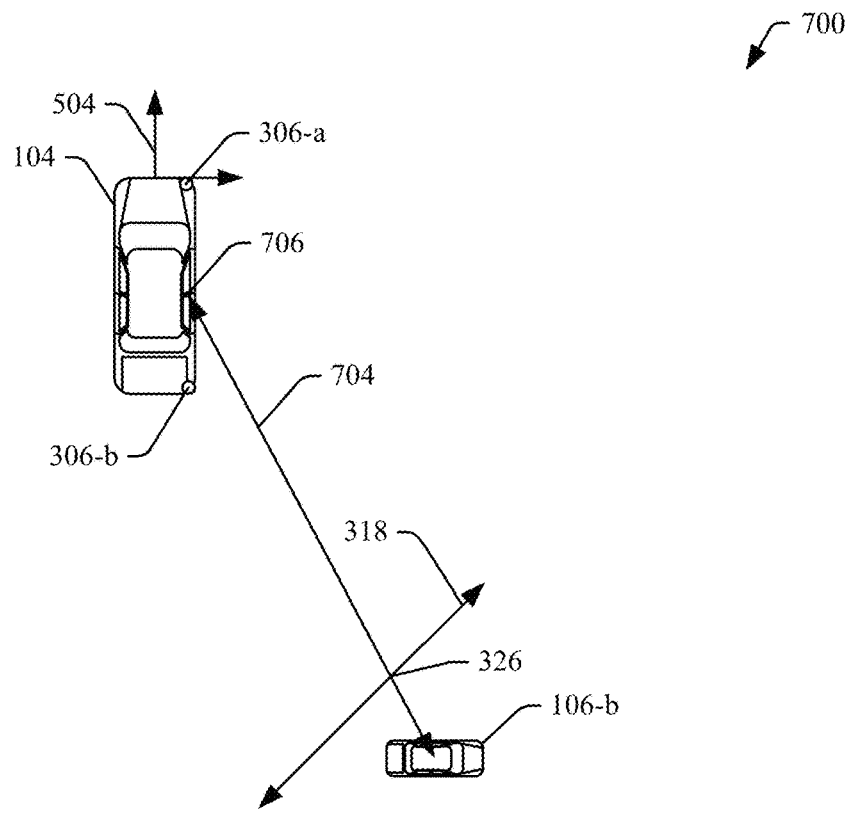
FIGS. 7A and 7B illustrate, in accordance with techniques of this disclosure, example reflection points.
Figure 7B:
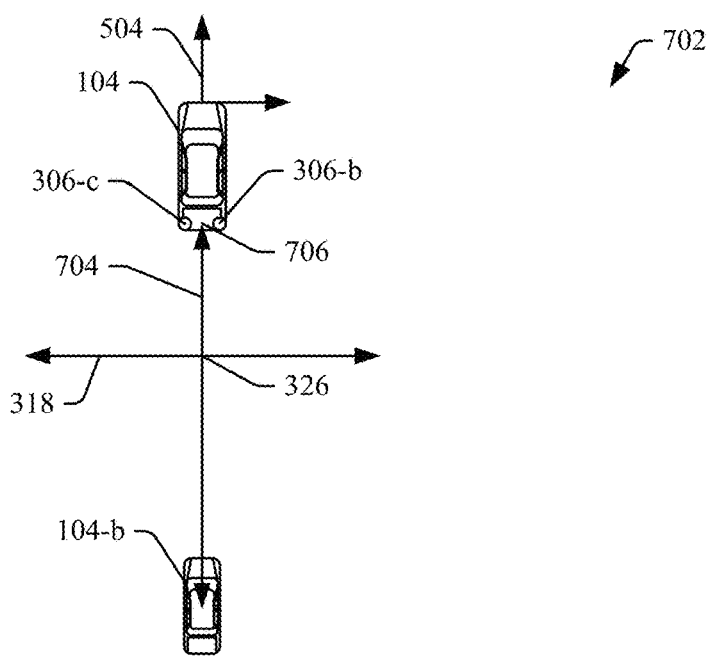

FIGS. 7A and 7B illustrate, at example illustrations 700 and 702, respectively, example reflection points 326. In order to determine the reflection point 326, the signal line 704 is generated. The signal line 704 passes through the centroid of the second object (e.g., object 106-b) and a virtual sensor location 706. The virtual sensor location 706 is based on an average position (relative to the VCS 504) of the respective sensors 306 that detected the second object.

Thus, a lateral coordinate of the virtual sensor location 706 may be a sum of the lateral coordinates of the sensor locations 308 of the sensors 306 that detected the second object divided by two, and a longitudinal coordinate of the virtual sensor location 706 may be a sum of the longitudinal coordinates of the sensors 306 that detected the second object divided by two. In the example illustration 700, the second object is detected by sensors 306-a and 306-b, and in the example illustration 702, the second object is detected by sensors 306-b and 306-c. If only one sensor 306 detects the second object, then the virtual sensor location 706 may be the sensor location 308 of the sensor 306.

The signal line 704 may be determined by Equation 4.

$$a2 * \text{long} + b2 * \text{lat} + c2 = 0 \quad (4)$$

where $a2 = {}^2(\text{long}_b - \text{long}_{vsl})$, $b2 = {}^2(\text{lat}_b - \text{lat}_{vsl})$, $c2 = (\text{long}_{vsl}^2 + \text{lat}_{vsl}^2) - (\text{long}_b^2 + \text{lat}_b^2)$, $\text{long}_{vsl}$ is the longitudinal coordinate of the virtual sensor location 706, and $\text{lat}_{vsl}$ is the lateral coordinate of the virtual sensor location 706.

The reflection point 326 is at an intersection of the signal line 704 and the reflection line 318. If $\text{abs}(b1*a2 - a1*b2) < 0.001$ then the reflection point 326 may not be determined and the process may move to the next moving object pair 312 (e.g., the second object may not be a ghost object 114). If $\text{abs}(b1*a2 - a1*b2) \geq 0.001$ then the reflection point 326 can be determined by Equations 5.

$$rp_{long} = \frac{b2*c1 - b1*c2}{b1*a2 - a1*b2}$$

$$rp_{lat} = \frac{a1*c2 - c1*a2}{b1*a2 - a1*b2} \quad (5)$$

where $rp_{long}$ is the longitudinal coordinate of the reflection point 326 and $rp_{lat}$ is the lateral coordinate of the reflection point 326.

Figure 8A:
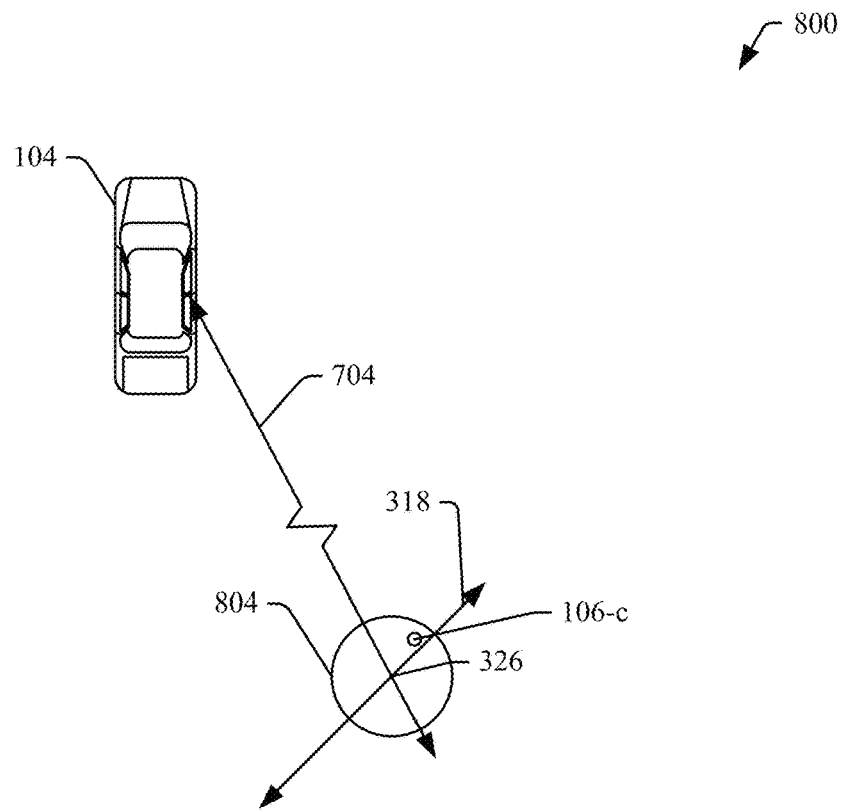
FIGS. 8A and 8B illustrate, in accordance with techniques of this disclosure, example distance determinations.
Figure 8B:
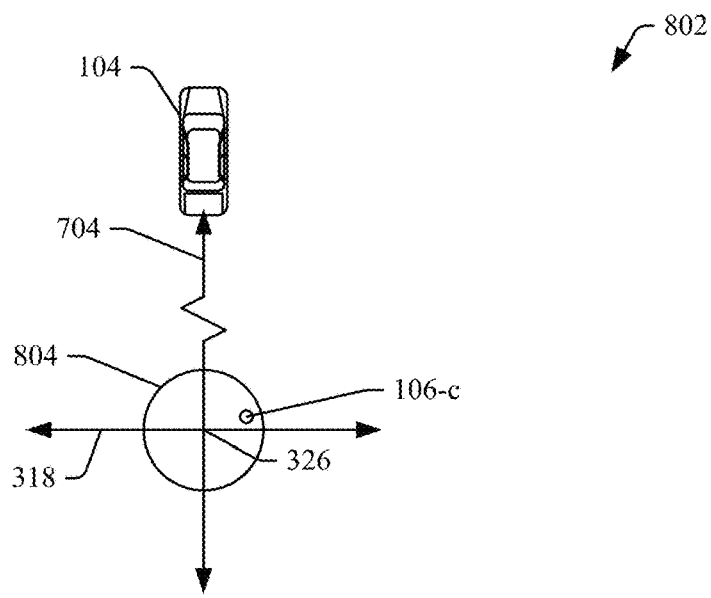

FIGS. 8A and 8B illustrate, at example illustrations 800 and 802, respectively, example distance determinations 330. The distance 804 may be a fixed constant (e.g., three meters). To determine if any of the area stationary objects 322 are within the distance 804, relative distances between the area stationary objects 322 and the reflection point 326 may be determined. If any of the area stationary objects 322 are within the distance 804 of the reflection point 326, the distance determination 330 will be a yes. In the example illustrations 800, 802, object 106-*c* is within the distance 804, thus, the distance determination 330 for object 106-*c* is a yes.

Figure 9A:
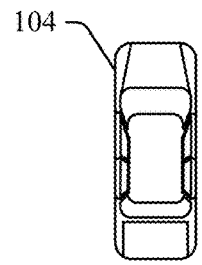
FIGS. 9A and 9B illustrate, in accordance with techniques of this disclosure, example expected velocities.
Figure 9A:
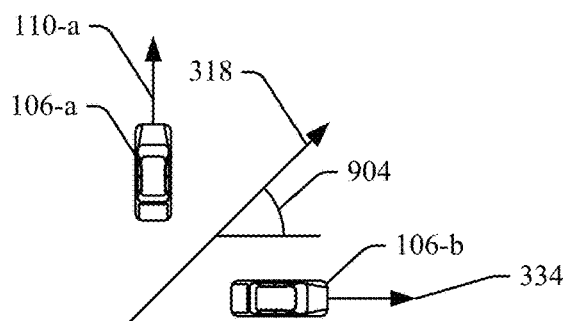
Figure 9B:
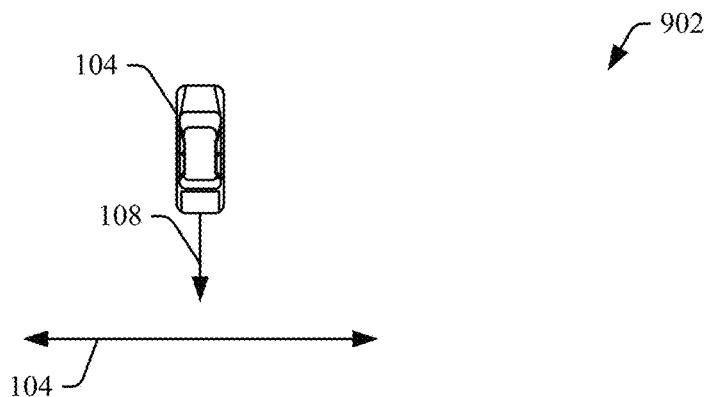
Figure 9B:
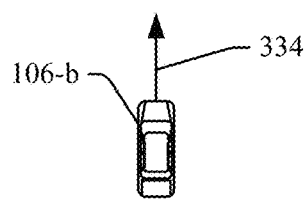

FIGS. 9A and 9B illustrate, at example illustrations 900 and 902, respectively, example expected velocities 334. The expected velocity 334 may be determined by Equation 6.

$egv_{long} = (va_{long}*\cos f(\theta) + va_{lat}*\sin f(\theta))*\cos f(-\theta) - (-va_{long}*\sin f(\theta) + va_{lat}*\cos f(\theta))*\sin f(-\theta)$ $egv_{lat} = -(va_{long}*\cos f(\theta) + va_{lat}*\sin f(\theta))*\sin f(-\theta) - (-va_{long}*\sin f(\theta) + va_{lat}*\cos f(\theta))*\cos f(-\theta)$ (6)

where $egv_{long}$ is the longitudinal component of the expected velocity 334, $egv_{lat}$ is the lateral component of the expected velocity 334, $va_{long}$ is the longitudinal component of the object velocity 110 of the first object (e.g., object velocity 110-*a* or host velocity 108), $va_{lat}$ is the lateral component of the object velocity 110 of the first object, and θ is an angle 904 of the reflection line 318 relative to the lateral axis of the VCS 504.

Because object 106-*b* is a ghost object 114, the expected velocity 334 generally aligns with the object velocity 110-*b*. As such, the object 106-*b* may be indicated as a ghost object 114 and either sent to the vehicle component 116 or filtered out of the objects 106 that are sent to the vehicle component 116.

By using the above techniques, the host vehicle 104 is able to accurately determine which of the objects 106 are ghost objects 114 while stationary or moving without any other knowledge of an environment around the host vehicle 104 (e.g., that there is a guardrail present). Furthermore, the host vehicle 104 can accomplish ghost object detection without unnecessary movement or multiple sensors 306 (although multiple sensors 306 have been described as detecting the second object, the process works similarly if the second object is only detected by a single sensor 306). Thus, the host vehicle 104 can quickly and effectively identify ghost objects 114 in a broad range of environments.

Example Method

Figure 10:
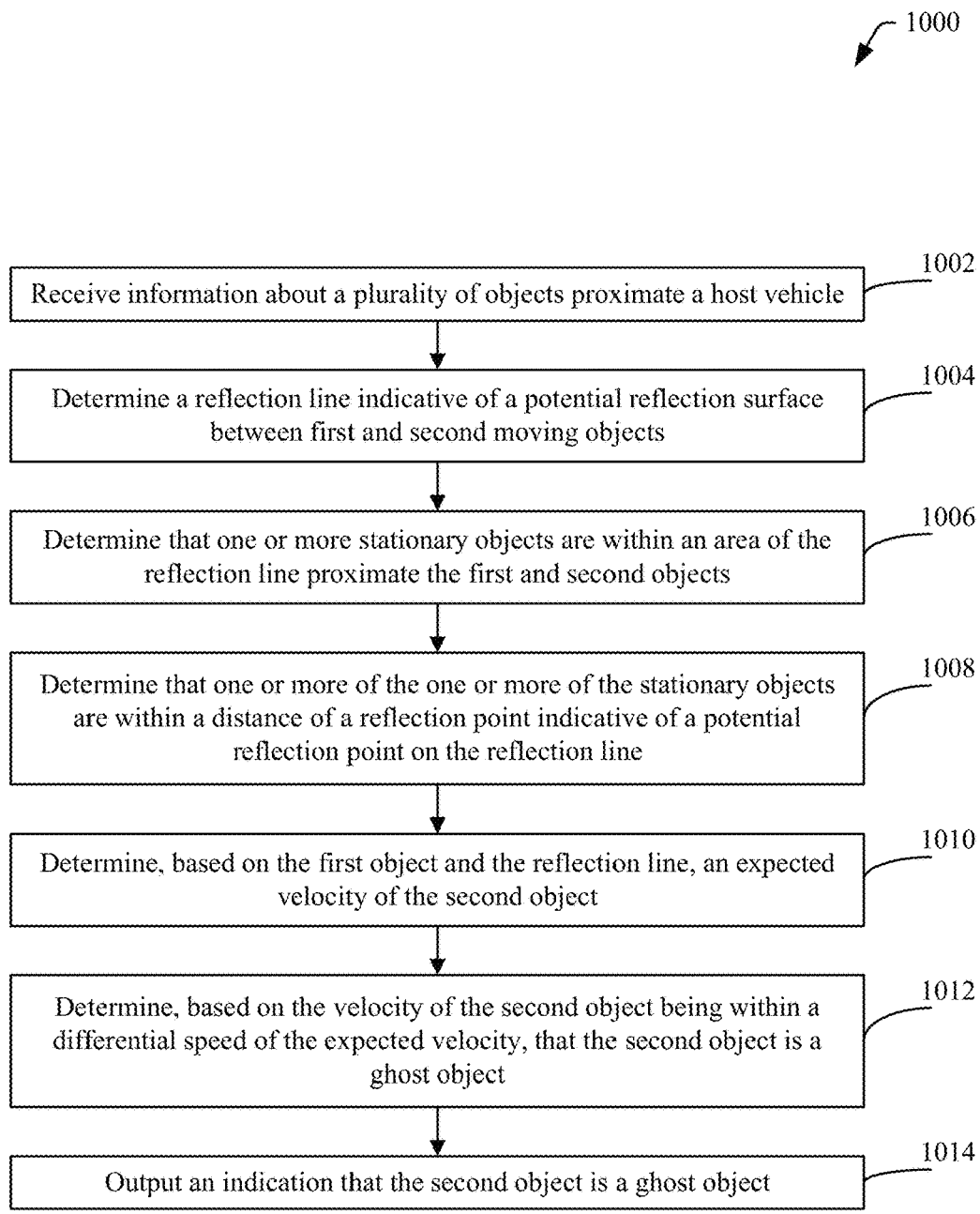
FIG. 10 illustrates, in accordance with techniques of this disclosure, an example method of ghost object detection.

FIG. 10 is an example method 1000 for ghost object detection. The example method 1000 may be implemented in any of the previously described environments, by any of the previously described systems or components, and by utilizing any of the previously described data flows, process flows, or techniques. For example, the example method 1000 can be implemented in the example environments of FIGS. 1A and 1B, by the example system 200, by following the example data flow 300, and/or as illustrated in the example illustrations of FIGS. 5-9. The example method 1000 may also be implemented in other environments, by other systems or components, and utilizing other data flows, process flows, or techniques. Example method 1000 may be implemented by one or more entities (e.g., the detection module 112). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 1002, information about a plurality of objects proximate a host vehicle is received. For example, the object pairing module 310 may receive the attributes 302, including the objects 106 and their respective attributes (e.g., object coordinates 304, object velocities 110, and sensors 306).

At 1004, a reflection line indicative of a potential reflection surface between first and second moving objects is determined. For example, the reflection line module 314 may determine the reflection line 318 based on a portion of the connection line 316 between the first and second moving objects.

At 1006, it is determined that one or more stationary objects are within an area of the reflection line proximate the first and second objects. For example, the area module 320 may determine that there are one or more area stationary objects 322. In some implementations, the area module 320 may determine that there are a plurality of area stationary objects 322.

At 1008, it is determined that one or more of the one or more stationary objects are within a distance of a reflection point indicative of a potential reflection point on the reflection line. For example, the distance module 328 may determine that one or more of the area stationary objects 322 are within the distance 804 of the reflection point 326 and provide the distance determination 330 of yes.

At 1010, an expected velocity of the second object is determined based on the first object and the reflection line. For example, the expected velocity module 332 may determine the expected velocity 334 based on the object velocity 110 of the second object and the reflection line 318.

At 1012, it is determined that the second object is a ghost object based on the velocity of the second object being within a differential speed of the expected velocity. For example, the ghost determination module 336 may determine that one or more speeds of the object velocity 110 of the second object are within the differential speed of one or more speeds of the expected velocity 334 and provide the ghost determination 338 of yes. Responsive to the ghost determination 338 of yes, the second object may be indicated as a ghost object 114 (e.g., by the object classification module 344). In some implementations, the ghost determination 338 may be used by the ghost probability module 340 to update a current probability 342 of the second object (e.g., from previous frames). The object classification module 344 may then indicate that the second object is a ghost object 114 responsive to determining that the probability 342 of the second object surpasses a threshold.

At 1014, an indication that the second object is a ghost object is output. For example, the object classification module 344 may output indications of the ghost objects 114, the real objects (e.g., objects 106 other than the ghost objects 114), or some combination thereof.

By using the example method 1000, can efficiently and effectively determine ghost objects in environments of a host vehicle. In doing so, downstream operations can perform as intended, many times with increased safety and reliability.

Examples

Example 1: A method comprising: receiving information about a plurality of objects proximate a host vehicle, the objects comprising two or more moving objects and one or more stationary objects; determining one or more moving object pairs of the moving objects; and for each of the moving object pairs: determining a reflection line that is: perpendicular to a connection line connecting a first object and a second object of the respective moving object pair; and between the first object and the second object; determining whether one or more of the stationary objects are within an area of an intersection of the connection line and the reflection line; and based on a determination that one or more of the stationary objects are within the area: determining whether one or more of the one or more of the stationary objects are within a distance of a reflection point that is at an intersection of: a signal line between the second object and the host vehicle; and the reflection line; and based on a determination that one or more of the one or more stationary objects are within the distance: determining, based on the first object and the reflection line, an expected velocity of the second object; determining whether a velocity of the second object is within a differential speed of the expected velocity; and based on the velocity of the second object being within the differential speed of the expected velocity: determining that the second object is a ghost object; and outputting an indication that the second object is a ghost object.

Example 2: The method of example 1, wherein the host vehicle is stationary.

Example 3: The method of example 1 or 2, wherein: the host vehicle is reversing; and the first object is the host vehicle.

Example 4: The method of example 1, 2, or 3, wherein the determining the moving object pairs comprises determining pairs of the moving objects that: have a difference in range within a span; and have speeds greater than a moving speed threshold.

Example 5: The method of any preceding example, wherein the area comprises a rectangular area that: is parallel to the reflection line; has a length centered on the connection line; and has a width centered on the reflection line, the width being smaller than the length.

Example 6: The method of any preceding example, wherein the determining whether one or more of the stationary objects are within the area comprises: projecting the stationary objects along with the first object and the second object to the connection line; and projecting the stationary objects to the reflection line.

Example 7: The method of any preceding example, wherein the length is around five times the width.

Example 8: The method of any preceding example, wherein the determining whether one or more of the stationary objects are within the area comprises determining that a plurality of the stationary objects are within the area.

Example 9: The method of any preceding example, wherein the signal line is between the second object and a virtual sensor, the virtual sensor comprising a centroid of one or more sensors that detected the second object.

Example 10: The method of any preceding example, wherein the information is received from a RADAR or LIDAR system, module, or component.

Example 11: The method of any preceding example, wherein the expected velocity is based further on a velocity of the first object and an angle of the reflection line.

Example 12: The method of any preceding example, wherein the determining whether the velocity of the second object is within the differential speed of the expected velocity comprises: determining whether a speed of the second object is within the differential speed of a speed of the expected velocity; and determining whether speeds of the second object in two directions are within the differential speed of speeds of the expected velocity in the two directions.

Example 13: The method of any preceding example, further comprising, based on the velocity of the second object being within the differential speed of the expected velocity, updating a probability that the second object is a ghost object, wherein the indication is based on the probability.

Example 14: A method comprising: receiving information about a plurality of objects proximate a host vehicle, the objects comprising first and second moving objects and one or more stationary objects; determining a reflection line indicative of a potential reflection surface between the first and second moving objects; determining that one or more of the stationary objects are within an area of the reflection line proximate the first and second objects; determining that one or more of the one or more of the stationary objects are within a distance of a reflection point indicative of a potential reflection point on the reflection line; determining, based on the first object and the reflection line, an expected velocity of the second object; determining, based on the velocity of the second object being within a differential speed of the expected velocity, that the second object is a ghost object; and outputting an indication that the second object is a ghost object.

Example 15: A system comprising at least one processor configured to: receive information about a plurality of objects proximate a host vehicle, the objects comprising two or more moving objects and one or more stationary objects; determine one or more moving object pairs of the moving objects; and for each of the moving object pairs: determine a reflection line that is: perpendicular to a connection line connecting a first object and a second object of the respective moving object pair; and between the first object and the second object; determine whether one or more of the stationary objects are within an area of an intersection of the connection line and the reflection line; and based on a determination that one or more of the stationary objects are within the area: determine whether one or more of the one or more of the stationary objects are within a distance of a reflection point that is at an intersection of: a signal line between the second object and the host vehicle; and the reflection line; and based on a determination that one or more of the one or more stationary objects are within the distance: determine, based on the first object and the reflection line, an expected velocity of the second object; determine whether a velocity of the second object is within a differential speed of the expected velocity; and based on the velocity of the second object being within the differential speed of the expected velocity: determine that the second object is a ghost object; and output an indication that the second object is a ghost object.

Example 16: The system of example 15, wherein the host vehicle is stationary.

Example 17: The system of example 15 or 16, wherein: the host vehicle is reversing; and the first object is the host vehicle.

Example 18: The system of example 15, 16, or 17, wherein the determination of whether one or more of the stationary objects are within the area comprises: projecting the stationary objects along with the first object and the second object to the connection line; and projecting the stationary objects to the reflection line.

Example 19: The system of any of examples 15-18, wherein the signal line is between the second object and a virtual sensor, the virtual sensor comprising a centroid of one or more sensors that detected the second object.

Example 20: The system of any of examples 15-19, wherein the expected velocity is based further on a velocity of the first object and an angle of the reflection line relative to the host vehicle.

Example 21: Computer-readable storage media comprising instructions that, when executed, cause at least one processor to: receive information about a plurality of objects proximate a host vehicle, the objects comprising two or more moving objects and one or more stationary objects; determine one or more moving object pairs of the moving objects; and for each of the moving object pairs: determine a reflection line that is: perpendicular to a connection line connecting a first object and a second object of the respective moving object pair; and between the first object and the second object; determine whether one or more of the stationary objects are within an area of an intersection of the connection line and the reflection line; and based on a determination that one or more of the stationary objects are within the area: determine whether one or more of the one or more of the stationary objects are within a distance of a reflection point that is at an intersection of: a signal line between the second object and the host vehicle; and the reflection line; and based on a determination that one or more of the one or more stationary objects are within the distance: determine, based on the first object and the reflection line, an expected velocity of the second object; determine whether a velocity of the second object is within a differential speed of the expected velocity; and based on the velocity of the second object being within the differential speed of the expected velocity: determine that the second object is a ghost object; and output an indication that the second object is a ghost object.

Example 22: A system comprising: at least one processor configured to perform the method of any of examples 1-14.

Example 23: Computer-readable storage media comprising instructions that, when executed, cause at least one processor to perform the method of any of examples 1-14.

Example 24: A system comprising means for performing the method of any of examples 1-14.

Example 25: A method performed by the system of any of examples 15-20.

Example, 26: A method comprised by the instructions of example 21.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    receiving information about a plurality of objects proximate a host vehicle, the objects comprising two or more moving objects and one or more stationary objects;
    determining one or more moving object pairs of the moving objects; and
    for each of the moving object pairs:
        determining a reflection line that is:
            perpendicular to a connection line connecting a first object and a second object of the respective moving object pair, and
            between the first object and the second object;
        detecting one or more of the stationary objects within an area of an intersection of the connection line and the reflection line;
        determining whether one or more of the one or more of the detected stationary objects are within a distance of a reflection point that is at an intersection of a signal line between the second object and the host vehicle and the reflection line;
        determining, based on the first object and the reflection line, an expected velocity of the second object;
        determining whether a velocity of the second object is within a differential speed of the expected velocity;
        determining, based on the velocity of the second object being within the differential speed of the expected velocity, whether the second object is a ghost object; and
        outputting, based on the determination that the second object is a ghost object, an indication that the second object is a ghost object.

2. The method of claim 1, wherein the host vehicle is stationary.

3. The method of claim 1, wherein:
    the host vehicle is reversing; and
    the first object is the host vehicle.

4. The method of claim 1, wherein the determining the moving object pairs comprises determining pairs of the moving objects that:
    have a difference in range within a span; and
    have speeds greater than a moving speed threshold.

5. The method of claim 1, wherein the area comprises a rectangular area that:
    is parallel to the reflection line;
    has a length centered on the connection line; and
    has a width centered on the reflection line, the width being smaller than the length.

6. The method of claim 5, wherein the determining whether one or more of the stationary objects are within the area comprises:
    projecting the stationary objects along with the first object and the second object to the connection line; and
    projecting the stationary objects to the reflection line.

7. The method of claim 5, wherein the length is around five times the width.

8. The method of claim 1, wherein the determining whether one or more of the stationary objects are within the area comprises determining that a plurality of the stationary objects are within the area.

9. The method of claim 1, wherein the signal line is between the second object and a virtual sensor, the virtual sensor comprising a centroid of one or more sensors that detected the second object.

10. The method of claim 1, wherein the information is received from a RADAR or LIDAR system, module, or component.

11. The method of claim 1, wherein the expected velocity is based further on a velocity of the first object and an angle of the reflection line.

12. The method of claim 1, wherein the determining whether the velocity of the second object is within the differential speed of the expected velocity comprises:
   determining whether a speed of the second object is within the differential speed of a speed of the expected velocity; and
   determining whether speeds of the second object in two directions are within the differential speed of speeds of the expected velocity in the two directions.

13. The method of claim 1, further comprising, based on the velocity of the second object being within the differential speed of the expected velocity, updating a probability that the second object is a ghost object, wherein the indication is based on the probability.

14. A system comprising at least one processor configured to:
   receive information about a plurality of objects proximate a host vehicle, the objects comprising two or more moving objects and one or more stationary objects;
   determine one or more moving object pairs of the moving objects; and
   for each of the moving object pairs:
      determine a reflection line that is:
         perpendicular to a connection line connecting a first object and a second object of the respective moving object pair; and
         between the first object and the second object;
      determine whether one or more of the stationary objects are within an area of an intersection of the connection line and the reflection line; and
      based on a determination that one or more of the stationary objects are within the area:
         determine whether one or more of the one or more of the stationary objects are within a distance of a reflection point that is at an intersection of:
            a signal line between the second object and the host vehicle; and
            the reflection line; and
         based on a determination that one or more of the one or more stationary objects are within the distance:
            determine, based on the first object and the reflection line, an expected velocity of the second object;
            determine whether a velocity of the second object is within a differential speed of the expected velocity; and
            based on the velocity of the second object being within the differential speed of the expected velocity:
               determine that the second object is a ghost object; and
               output an indication that the second object is a ghost object.

15. The system of claim 14, wherein the host vehicle is stationary.

16. The system of claim 14, wherein:
   the host vehicle is reversing; and
   the first object is the host vehicle.

17. The system of claim 14, wherein the determination of whether one or more of the stationary objects are within the area comprises:
   projecting the stationary objects along with the first object and the second object to the connection line; and
   projecting the stationary objects to the reflection line.

18. The system of claim 14, wherein the signal line is between the second object and a virtual sensor, the virtual sensor comprising a centroid of one or more sensors that detected the second object.

19. The system of claim 14, wherein the expected velocity is based further on a velocity of the first object and an angle of the reflection line relative to the host vehicle.

20. A non-transitory computer readable storage medium comprising instructions that, when executed, cause at least one processor to:
   receive information about a plurality of objects proximate a host vehicle, the objects comprising two or more moving objects and one or more stationary objects;
   determine one or more moving object pairs of the moving objects; and
   for each of the moving object pairs:
      determine a reflection line that is:
         perpendicular to a connection line connecting a first object and a second object of the respective moving object pair; and
         between the first object and the second object;
      determine whether one or more of the stationary objects are within an area of an intersection of the connection line and the reflection line; and
      based on a determination that one or more of the stationary objects are within the area:
         determine whether one or more of the one or more of the stationary objects are within a distance of a reflection point that is at an intersection of:
            a signal line between the second object and the host vehicle; and
            the reflection line; and
         based on a determination that one or more of the one or more stationary objects are within the distance:
            determine, based on the first object and the reflection line, an expected velocity of the second object;
            determine whether a velocity of the second object is within a differential speed of the expected velocity; and
            based on the velocity of the second object being within the differential speed of the expected velocity:
               determine that the second object is a ghost object; and
               output an indication that the second object is a ghost object.

* * * * *